May 31, 1966  W. H. PARMELEE  3,253,786
WINDSHIELD SPRAYING DEVICE
Filed Sept. 12, 1962
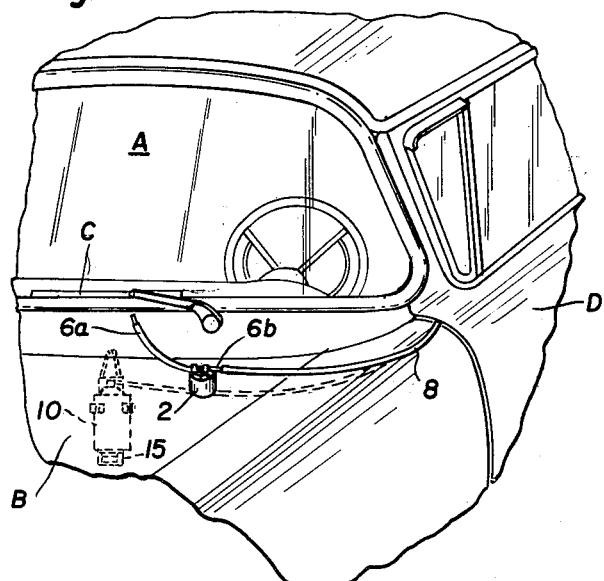
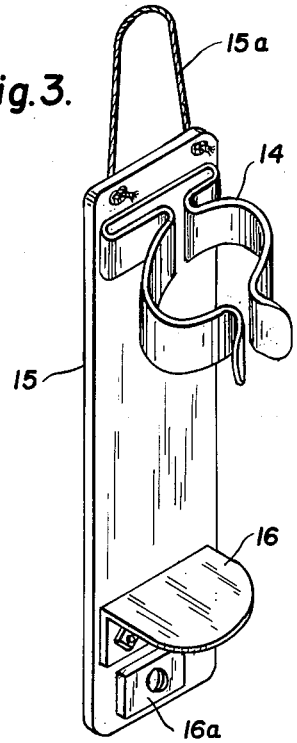
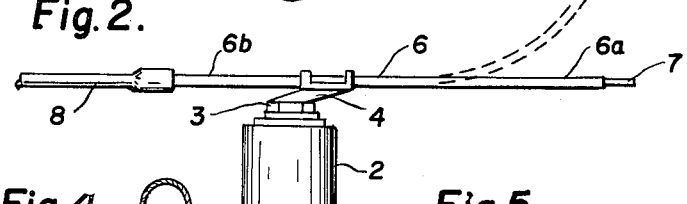
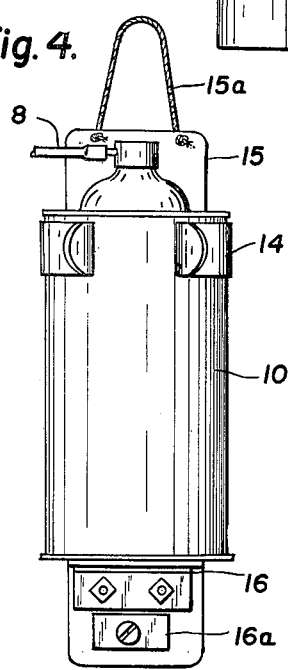
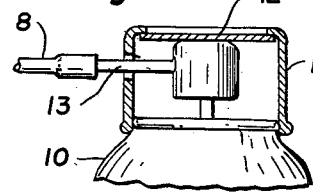
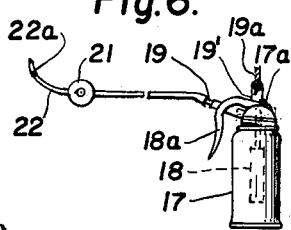
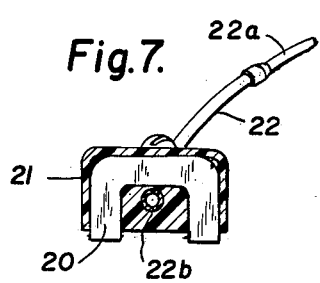
INVENTOR.
WILLIAM H. PARMELEE

United States Patent Office 3,253,786
Patented May 31, 1966

3,253,786
WINDSHIELD SPRAYING DEVICE
William H. Parmelee, 5036 W. Library Ave.,
Bethel Park, Pa.
Filed Sept. 12, 1962, Ser. No. 223,157
4 Claims. (Cl. 239—284)

This invention is for an automobile accessory in the nature of a windshield spraying device and is for such a device especially designed for use on vehicles not equipped with built-in windshield "squirters," or for emergency use where the built-in arrangement is out of order or ineffective, or for applying deicing fluid. This application constitutes a continuation-in-part of my application Serial No. 93,162, filed March 3, 1961, now abandoned.

In most parts of the country there are a realtively few days when windshields become splashed from dirty water, slush and mud from the wheels of other vehicles and when the rain is inadequate to wet the windshields enough for the wiper blades to wipe clean the area in which they are effective. Consequently, windshield squirters are usually supplied by car builders only as "extras" and many cars have no such equipment. With cars that are so equipped, the occasions on which they are needed may be so infrequent that they are neglected between times and fail to work when required, and the driver cannot take time or find facilities to fix them. In many cases the glass jars of water under the hood for such systems will have been broken due to freezing of the water by inattention thereto. On the relatively few occasions during the year when squirters are necessary, the lack or failure may not only be inconvenient, but dangerous, especially on high speed highways with heavy truck traffic and few service areas. Also, in many parts of the country it is necessary to use a de-icing fluid to remove ice and snow accumulations for which the usual cleaning liquid in the squirting system is not effective.

The present invention has for its purpose to provide a windshield squirting device that can be almost instantly put into service on practically any car without tools and without mechanical ability and which may be compactly stored away in the automobile when not required.

According to the present invention there is provided a permanent magnet to which a rigid but ductile or bendable length of small diameter tubing, such as ductile copper tubing, is affixed through an intervening connector. At one end of this tube there is a nozzle having a small orifice and the other end provides a nipple to which a small flexible plastic or rubber tubing is applied. This small diameter tubing may be led to the interior of the vehicle through the space between the front door and the body and when the door is closed it will be pinched to hold it in place but because of yieldable weatherstripping on the edge of the door and the firmness of the tubing it will not be pinched sufficiently to close the passageway therethrough. Inside the vehicle is a fluid containing vessel or reservoir to which the flexible tubing is connected, and there is an operator controlled means for effecting discharge of liquid from the vessel to the nozzle outside the car. In use, the magnet is placed in position on a metal part of the car in front of the windshield and the nozzle is bent with one's fingers to aim toward the windshield in the path of travel of the windshield wiper. The magnet holds the nozzle on the car in the position in which it is aimed. The driver may then from time-to-time as needed discharge liquid from vessel against the windshield into the path of the wiper blade.

Preferably, the liquid vessel is a disposable pressure can with a valved connection for the tubing and hose with a propellant in the can over the liquid to force it out as in conventional aerosol cans. This can is removably held on a panel in such manner that it may be quickly replaced and the panel has means by which it may be suspended from the instrument panel of the car. The supporting panel for the pressure can provide an armature or keeper on which the magnet may be placed when the device is not in use, with the flexible tubing wound about the assembly to make a compact package for shipping or storing.

My invention may be more fully understood by reference to the accompanying drawings in which:

FIG. 1 is a perspective view of the front of an automobile showing the manner of using the invention;

FIG. 2 is a side elevation of the squirter unit itself in the form in which it is originally supplied to the user, with the dotted lines indicating how the nozzle tube may be bent;

FIG. 3 is a plan view of a holder or panel in which a pressure can may be placed;

FIG. 4 is a front elevation of the holder with a can in place therein;

FIG. 5 is a fragmentary vertical section through the top of a suitable pressure can with a nipple at the outlet to which the flexible tubing is fitted;

FIG. 6 is a modification showing a different form of hand operated pressure vessel; and FIG. 7 shows a modified form of squirter unit.

In the drawings 2 designates a well-known type of permanent magnet, referred to as a pot magnet, with the poles at the bottom end as viewed in FIG. 1. It has a centrally positioned, tapped hole in the opposite or top end. Tightly screwed and preferably jammed in this hole to prevent relative turning is a screw or stud 3 on a connection body 4 having clip or holder portions. In this clip is received and soldered or otherwise secured a length of ductile or bendable but rigid tubing 6 which is of a character that may be bent with ones' hands and when bent will retain its form. Extruded soft copper tubing of $3/16''$ or $1/4''$ outside diameter, such as used for internal combustion engine fuel lines is well suited to this purpose. The holder supports the length of tubing above the magnet with the tube disposed diametrically across the top. The tube is mounted in the holder at a point between its ends to provide a long portion or nozzle extension 6a and a shorter portion or nipple extension 6b. The outer end of the portion 6a has a tip 7 in which is a small restricting orifice.

Fitted over the short extension or nipple portion 6b is a rubber or rubber-like small diameter flexible tubing, such as a vinyl or other plastic tubing 8. It should be freely flexible and several feet in length. The user may cut off any excess he does not require. In use, this flexible tubing is led through the space between the front door of the car and the body when the door is open. Then when the door is closed the tubing is pinched between the door and door frame, but because of the weatherstripping on the door, it is not pinched sufficiently to block the flow of liquid thereto.

The inner end of the tubing 8 is connected to a liquid container of a character where liquid is expelled under pressure through the tubing under direction of the operator. It may include a small pump, a flask with a rubber ball to create pressure therein, or a squeeze container of any of various kinds now available. I prefer, however, to use a disposable can in which a window cleaning and de-icing liquid is confined under pressure by a gas. This gas may be a commonly used propellant as in conventional aerosol cans or what is equally satisfactory for this purpose and less expensive, carbon dioxide or air. Single use disposable containers of this kind are commonly available with a valve in the top which is depressed by a plastic fitment to discharge the liquid. Instead of the usual discharge orifice in the plastic fitment, it is here provided with a nipple to which the hose is fitted.

Such a can, designated 10, is here shown and in FIG. 5 there is shown in detail a preferred form of cap and fitment. The usual removable metal cap 11 in this case has a depressible central top disk 12 that bears against the pressure can plastic fitment of a usual type but which here has a nipple 13 projecting through a slot in the cap and onto which the end of the tubing 8 is snugly fitted.

This container is removably held in a spring clip 14 on a base panel 15, the panel having a bracket 16 thereon for supporting the bottom of the vessel, and resisting downward movement of the vessel when pressure is applied to the disk 12. The panel is provided with a loop 15a of a flexible braid or cord so that it may be hung from a bottom or knob on the instrument panel of an automobile, such, for example, as the headlight switch. The panel may have a magnetizable area or strip 16a below the bracket on which the magnet of the squirting unit may be placed when the device is packaged or stored, and which provides at this time an armature or "keeper" for the magnet. The panel itself is preferably non-metallic.

In the modification shown in FIG. 6 a well-known squeeze grip type of oil can is used as a pressure vessel instead of a disposable pressure charged can. It comprises a vessel 17 with a removable cover 17a. From the cover there is suspended into the can a pump 18 operated by an external squeeze grip handle 18a. The pump forces a measured amount of liquid with each full stroke of the handle out a discharge tube 19 to which the flexible tubing is fitted. Dispensers of this type are well known, but I may provide means such as ears 19' on the cover with a loop 19a for suspending the dispenser from the instrument dash of the vehicle.

In FIG. 7 I have shown another form of squirting unit utilizing a horse-shoe type of permanent magnet. In this FIGURE 20 designates a small but powerful magnet which, as in the previous form is an "Alnico" or other strongly permanently magnetic material. It is housed within a body 21 which may be plastic, such as polyester cast about the magnet. The nozzle tube 22 passes between the legs of the magnet and is held in place by the plastic which holds the tube in fixed relation to its magnet. As in the form previously described, the nozzle tube is bendable but not self-flexing being of a soft or bendable character. One end 22a of the tube projects well beyond the body and has a restricted opening at its terminal. The other end of the tube 22b need be only long enough to provide a nipple over which the flexible tubing or hose is fitted. The poles of the magnet should project slightly beyond the body in which it is mounted, so that when the body is placed on an automobile in front of the windshield, the pole pieces of the magnet will contact the metal against which the device is placed.

In both a pot magnet and a horseshoe magnet both poles are in the same plane so that when the device is placed on the steel body of an automobile the magnetic circuit is closed through the steel and the device will remain in position against high wind velocity such as may be encountered in driving.

The foregoing are illustrative embodiments of the invention which may be otherwise constructed so long as to provide a magnet which will firmly attach to the car below, above or around the windshield, the magnet having means for mounting or holding a nozzle tube in fixed position relatively thereto and in which the nozzle tube may be flexed or bent to suit any make and model of car on which it is used. The flexible tubing or hose should be one that is freely flexible, even in cold weather so that it may lie limply in position and not exert pull or tension on the squirter unit such as might tend to rotate the squirter after it has been set in position. After the device has been once used, it is ordinarily not necessary to again bend the nozzle tube since the operator will place it each time in about the same position and the area into which the stream need be directed is large and close aim is not required.

The tubing should be sufficiently elastic so that it will frictionally grip the nipples over which it is fitted and should be of small diameter both to reduce the volume and its capacity for holding residual liquid in the tubing and to prevent the door from freely closing while permitting it to depress the weather-stripping. When not in use, the tubing can be wrapped about the liquid holding vessel and the entire device placed in the glove compartment or elsewhere where it requires little storage space.

In FIG. 1, A is the windshield of an automobile, B the hood at the front of the windshield, C the windshield wiper and the car door is designated D. The view indicates a manner of placing the squirter on the hood and leading the flexible hose through the door at the "dog-leg" or offset just above the top hinge of the door. In most cases it is necessary to clean only the area in front of the driver, but obviously if a greater area is to be cleaned two units or a dual nozzle at the end of the bendable metal tube may be employed. Various other modifications and ways of using the device will be apparent.

I claim:

1. A windshield squirting device comprising a single elongated seamless nozzle tube of a ductile but rigid character capable of being bent with one's hands and retaining the shape to which it is bent, the tube having a restricted discharge orifice at one end, a permanent magnet having poles facing in the same direction, and connecting means on the tube attached to the magnet and fixedly securing the nozzle tube intermediate its ends to the magnet in relatively fixed relation with the poles of the magnet extending in a direction transverse to the length of the nozzle tube, and with a length of the nozzle tube between the magnet and the restricted discharge orifice being such that it may be bent in a gradual curve both upwardly and sideways with respect to the magnet the opposite end of the tube providing a nipple-forming extension over which the end of the flexible hose may be snugly fitted.

2. A windshield squirting device as defined in claim 1 in which a length of flexible resilient tubing is fitted to the nipple providing end of the nozzle tube, and means at the other end of the flexible tubing for controllably supplying liquid under pressure thereto.

3. A windshield squirter for temporary application to a vehicle having a steel body and a windshield, comprising a permanent magnet, a single elongated seamless nozzle tube of a ductile but rigid character capable of being bent in one's hands and retaining the shape to which it is bent extending in a direction cross-wise of the axes of the poles of the magnet, means intermediate the ends of the tube permanently connecting the tube and magnet in relatively fixed relation, one end portion of the tube projecting a sufficient distance beyond the magnet and connecting means to enable it to be grasped and bent and having a restricted orifice at its terminal, the other end of the tube extending beyond the magnet and providing a hose attaching nipple.

4. A windshield squirting device comprising an elongated nozzle tube of a ductile but rigid character capable of being bent with one's hands and retaining the shape to which it is bent, the tube having a restricted discharge orifice at one end, a permanent magnet having poles facing in the same direction, means securing the nozzle tube intermediate its ends to the magnet in relatively fixed relation with the poles of the magnet extending in a direction transverse to the length of the nozzle tube, a length of flexible resilient tubing fitted to the other end of the nozzle tube, means at the other end of the flexible tubing for controllably supplying liquid under pressure thereto, said last-named means comprising a panel with means for suspending it from the dash of a vehicle, a container having liquid under pressure carried on the panel, a magnetizable area on the panel on which said magnet poles may be set to provide a keeper for the magnet when the device is not in use, and a depressible valve in the top of the container for controlling the discharge of liquid therefrom into the tube.

References Cited by the Examiner

UNITED STATES PATENTS

| | | | |
|---|---|---|---|
| 1,932,143 | 10/1933 | Piercy. | |
| 2,105,676 | 1/1938 | Stow | 239—284 |
| 2,594,955 | 4/1952 | Markowitz. | |
| 2,721,717 | 10/1955 | Wales. | |
| 2,939,671 | 6/1960 | Beekman. | |
| 2,941,728 | 6/1960 | Paldanius | 239—284 |
| 2,961,168 | 11/1960 | Webb | 239—284 |
| 2,964,812 | 12/1960 | Cook. | |
| 2,968,441 | 1/1961 | Holcomb | 239—588 |
| 3,008,170 | 11/1961 | Marks | 239—284 |
| 3,010,473 | 11/1961 | McCurnin | 239—284 |
| 3,104,826 | 9/1963 | Morris | 239—424 |

EVERETT W. KIRBY, *Primary Examiner.*

MEYER PERLIN, *Examiner.*